G. YATES.
WHEEL.
APPLICATION FILED SEPT. 25, 1919.

1,333,527.

Patented Mar. 9, 1920.
2 SHEETS—SHEET 1.

WITNESSES
R. E. Rousseau
C. E. Tramer

INVENTOR
George Yates,
BY
ATTORNEYS

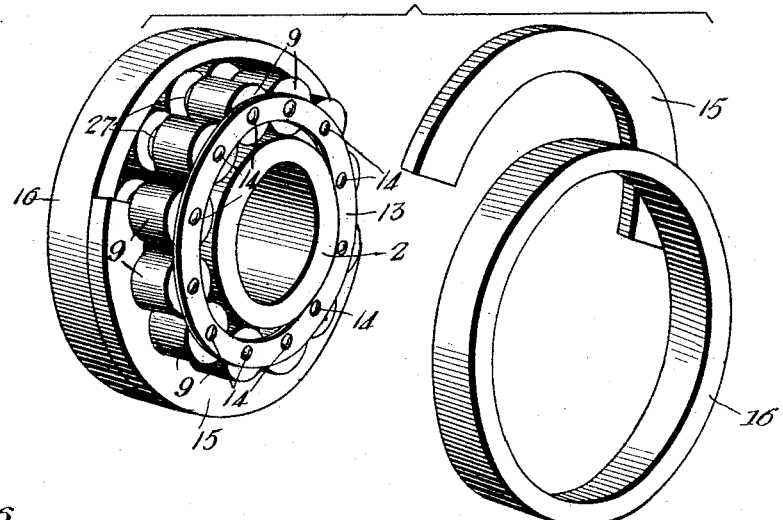
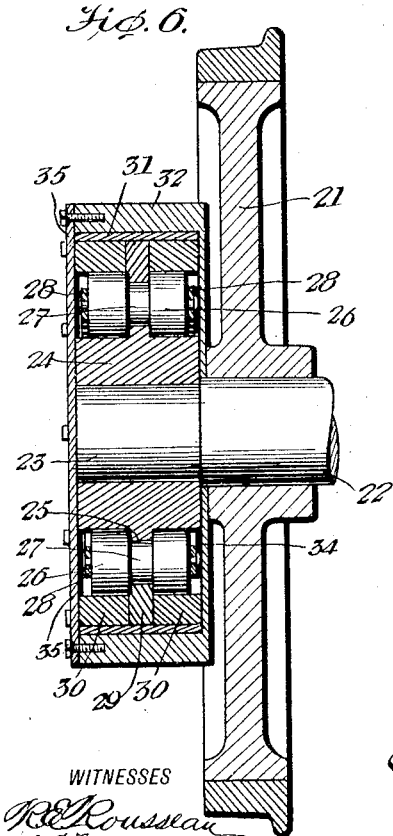
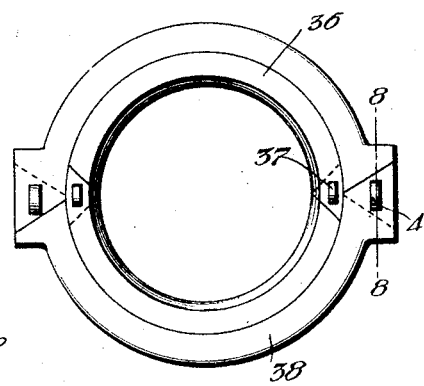
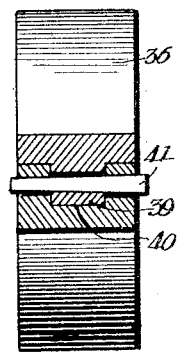
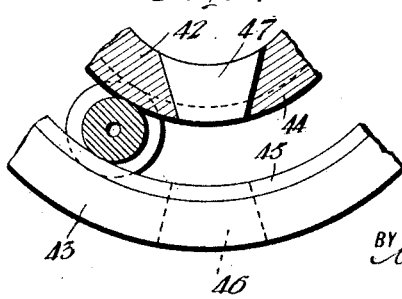

UNITED STATES PATENT OFFICE.

GEORGE YATES, OF CHICAGO, ILLINOIS.

WHEEL.

1,333,527.     Specification of Letters Patent.     Patented Mar. 9, 1920.

Application filed September 25, 1919. Serial No. 326,110.

*To all whom it may concern:*

Be it known that I, GEORGE YATES, a citizen of the United States, and a resident of Chicago, in the county of Cook and State of Illinois, have invented certain new and useful Improvements in Wheels, of which the following is a specification.

My invention is an improvement in wheels, and has for its object to provide in wheels for railway cars a construction wherein roller bearings are arranged between the wheels and the axle, or between the axle and the journal box, and wherein the wheels are rigidly connected.

Figure 1:
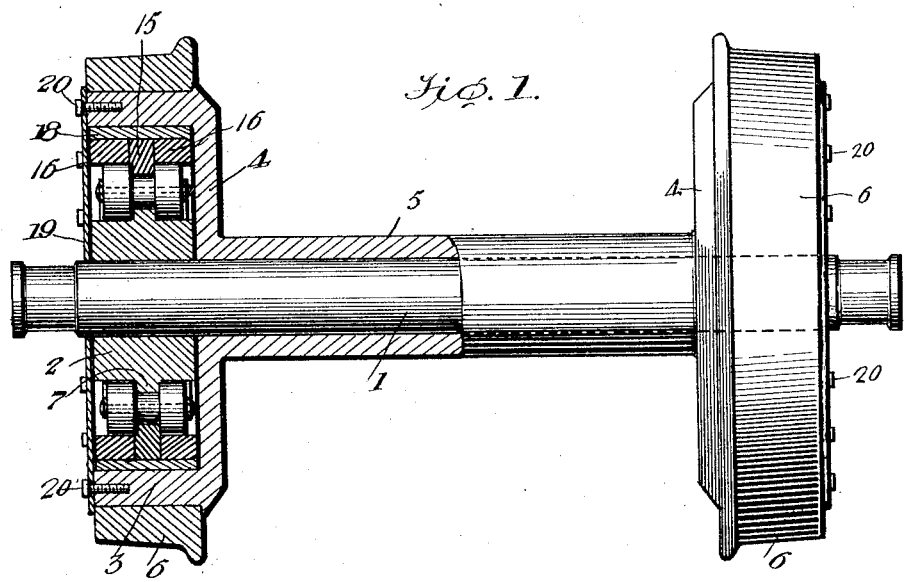
Figure 1 is a front view of a wheel assembly with one of the wheels in section.
Figure 2:
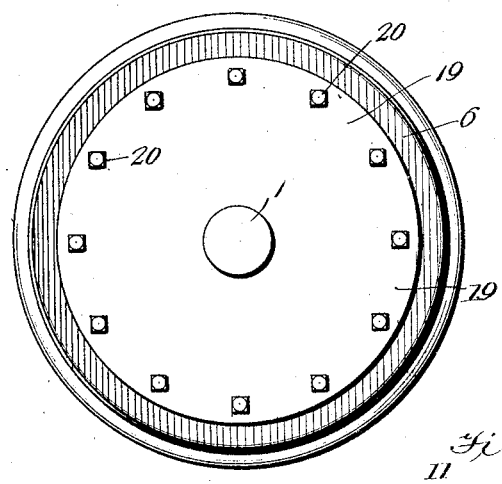
Fig. 2 is a side view looking from the outer side of one of the wheels.
Figure 3:
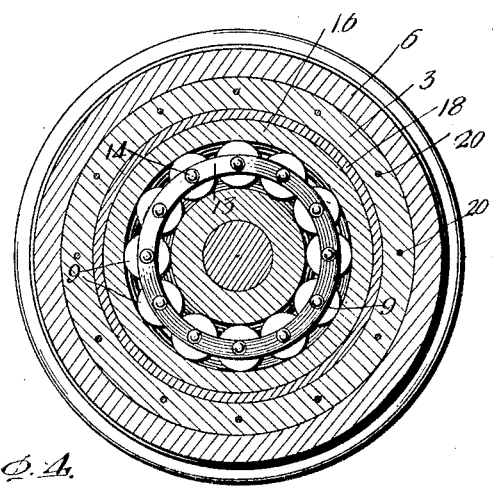
Fig. 3 is a section in the plane of the wheel.
Figure 4:
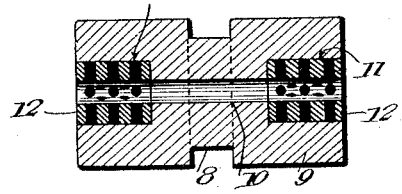
Fig. 4 is a longitudinal section of one of the rollers.

Fig. 5 is a perspective view of the roller bearing assembly with parts separated, Fig. 6 is a vertical section of another embodiment of wheel, Fig. 7 is a side view of a modified form of inclosing ring or housing, Fig. 8 is a section on the line 8—8 of Fig. 7, Fig. 9 is a partial section in the plane of the wheel of a modified form of roller support, Fig. 10 is a perspective view of one of the keys.

In the embodiment of the invention shown in Figs. 1 to 5 inclusive, the wheel and axle assembly consists of the axle 1 of usual construction, upon which are arranged the wheels, this assembly being designed for railroad cars of any character. The wheel assembly consists of a hub portion 2 which is pressed upon the axle in the usual manner, as for instance by hydraulic pressure, and a rim portion 3, spaced apart from the hub portion by the roller bearing to be described.

Each rim portion is supported by a radial web 4, and the webs of a wheel assembly for one axle are connected by a sleeve 5, the said sleeve being integral at its ends with the webs, and the axle 1 is arranged within the sleeve. A suitable tire 6 is held on the rim portion 3 of the wheel, the said tire 6 being frusto-conical peripherally as shown, and having the flange for engaging the inner edge of the rail.

The hub portion 2 of the wheel has a central annular rib 7 on its periphery, and this rib is adapted to be received within annular grooves 8 in the rollers 9 which form the roller bearing. Each of these rollers as shown has the annular groove 8 intermediate its ends and at approximately its center, and the bore 10 of each roller is reamed or counter-bored at its ends as shown at 11, to receive bronze bushings 12, which have radial perforations as shown. Any preferred number of rollers may be arranged about the hub portion 2, and the rollers are connected by holding rings 13 at their ends, the said rings being connected by rivets 14 or the like, which are passed through the bores 10 of the rollers and are headed at the outer face of each ring 13.

A housing is provided for the roller bearing, the said housing consisting of three sections, namely a central section 15 and two similar lateral sections 16. The central section 15 is composed of two portions, each portion being a half circle, and the said section is of greater thickness than the sections 16, and of a width such that it will fit within the grooves 8 of the rollers. The sections 16 are continuous rings, and in placing the housing, the portions of the section 15 are first placed, by inserting them in the grooves until their ends abut, after which the sections 16 are slipped on laterally.

The housing is completed by a ring 18 which fits outside of the sections 15—16, it being understood that the peripheral surfaces of the sections 15—16 are flush. The inner section of the ring 16 fits against the web 4, as does also the inner edge of the ring 18, and the outer section 16 is held in place by a housing disk 19 which is secured to the outer edge of the rim portion 3 by screws 20. This housing disk or plate has an opening for the axle, and the screws 20 engage threaded openings in the rim portion.

In the embodiment shown in Fig. 1 the roller bearing is arranged within the wheel. In Fig. 6, however the bearing is outside the wheel, being arranged at one face of the wheel, in the present instance the outer face. In this construction the wheel 21 is secured to the axle 22, and beyond the wheel on the reduced portion 23 of the axle a hub 24 is rigidly secured, the said hub corresponding to the hub 2 of Fig. 1. This hub 24 has an annular peripheral rib 25, and the rollers 26 have the annular grooves 27 within which the rib 25 engages. The assemblage of rollers is held by the holding rings 28, in the same manner as the rollers 9 are held, and the housing for the rollers consists of the central section 29 and lateral sections 30 similar to the sections 15 and 16 of Fig. 1. A ring 31 is arranged outside of these sections 29 and 30, and a rim portion 32 which corresponds to the rim portion 3 of Fig. 1, engages outside of the ring 31. This rim portion, which corresponds to the journal box of the usual truck assembly and which is adapted for connection with the truck frame, has a radial web 34 which fits between, at its inner edge, the hub portion 24 of the roller bearing assembly and the hub of the wheel 21. A housing plate 35 is secured to the outer face of the roller assembly to prevent displacement of the outer section 30 of the roller bearing housing.

In Figs. 7 and 8 is shown a modified construction of housing for the roller assembly. In this arrangement, instead of making a central section 29 and lateral sections 30, the housing is an integral structure in cross section, consisting of two semi-circular similar sections. Each of these sections 36 has an internal central rib for engaging the grooves 8 of the rollers, and at their abutting ends one section has a lug, and the other a recess for receiving the lug. The sections have registering openings for receiving a key 37, and the bottom of the recess and the ends of the sections and on each side of the lug are inclined as indicated in Fig. 7 so that the ends abut on lines inclined to radii of the ring. The outer ring 38 which corresponds to the elements 2 of Fig. 1 is similarly arranged, consisting of sections which abut at their ends on planes converging toward the center of the bearings. As shown in Fig. 8 one section has lugs 39 and the other recesses 40 for receiving the lug, and the keys 41 are passed through registering openings in the sections.

In Figs. 9 and 10 the elements 42 and 43 corresponding to the elements 2 and 15—16 of Fig. 1 are continuous solid integral rings, each ring having a central rib 44 and 45 respectively for engaging the grooves of the rollers. Each ring is provided also at one point with a keyway 46 through which the rollers may be inserted, and after the last roller has been placed these openings 46 are filled by keys 47. These keys are held from displacement by elements corresponding to the axle and to the ring 18 of Fig. 1.

Because of the sectional construction of the element 38 shown in Fig. 7, it can be placed on the inner side of the wheel as well as on the outer, since it can be separated into its sections to permit it to be placed. Because of the inclined abutting faces of the sections 36 and 38 of Fig. 7, they can be ground to an exact fit, and wear can be compensated for by regrinding. The beveled ends meet on planes converging toward the center of the sections, and it will be evident that grinding of these abutting ends will make the diameter of the sections smaller.

In the construction shown in Fig. 1, the ends of the axle are engaged with the usual journal boxes of the truck assembly and should a roller break, or the bearing be otherwise damaged, there can be no trouble from this cause, since the axle can still rotate freely in the journal boxes. Hence a broken bearing will merely lock the wheel to the axle.

I claim:

1. In wheels, the combination with the axle, of rims having radial webs, the webs being rigidly connected by a tubular structure for receiving the axle, a hub rigid with each end of the axle, a roller bearing arranged between each hub and the rim of the wheel, and means for retaining the roller bearing in place, the rollers being annularly grooved intermediate their ends, and the hub having an annular rib engaging the groove, and a housing ring between the rim and the rollers and having a rib engaging the grooves of the rollers.

2. In wheels, the combination with the axle, of rims having radial webs, the webs being rigidly connected by a tubular structure for receiving the axle, a hub rigid with each end of the axle, a roller bearing arranged between each hub and the rim of the wheel, and means for retaining the roller bearing in place.

3. In wheels, the combination with the axle, of a hub on each end thereof, a rim concentric with the hub and spaced apart therefrom, and a roller bearing held between the rim and the hub, the rims at each end of the axle being rigidly connected, said connection comprising a radial web at each rim and a tubular casing for the axle connecting the webs.

4. In wheels, the combination with the axle, of a hub on each end thereof, a rim concentric with the hub and spaced apart therefrom, and a roller bearing held between the rim and the hub, the rollers being annularly grooved intermediate their ends and the grooves registering, and a retaining housing between the rim and the bearing and having an annular rib for engaging the grooves of the rollers, said housing consisting of a central and lateral sections, the central section being of less internal diameter than the lateral sections and fitting within the grooves and consisting of half sections, the lateral sections abutting the outer faces of the central section, and means secured to the rim at the opposite side from the web for holding said lateral sections in place.

5. In wheels, the combination with the axle, of a hub on each end thereof, a rim concentric with the hub and spaced apart therefrom, and a roller bearing held between the rim and the hub, the rollers being annularly grooved intermediate their ends and the grooves registering, and a retaining housing between the rim and the bearing and having an annular rib for engaging the grooves of the rollers, said housing consisting of a central and lateral sections, the central section being of less internal diameter than the lateral sections and fitting within the grooves and consisting of half sections, the lateral sections abutting the outer faces of the central section.

6. In wheels, the combination with the axle, of a hub on each end thereof, a rim concentric with the hub and spaced apart therefrom, and a roller bearing held between the rim and the hub, the rollers being annularly grooved intermediate their ends and the grooves registering, and a retaining housing between the rim and the bearing and having an annular rib for engaging the grooves of the rollers.

7. In combination, a wheel assembly comprising an axle and the wheels, the wheels having rim portions and being rigidly connected to turn together, the axle carrying means for engagement with the truck frame, and a roller bearing arranged between said truck frame engaging means and the rim of the wheel.

8. A wheel assembly comprising the combination with the axle, of a tire and a tire supporting means at each end of the axle, the tire supporting means being rigidly connected, and a roller bearing between each tire supporting means and the axle.

9. A wheel assembly comprising the combination with the axle, of a tire and a tire supporting means at each end of the axle, the tire supporting means being rigidly connected, and an anti-friction bearing between each tire supporting means and the axle.

10. A wheel assembly comprising the combination with the axle, of a tire and a tire supporting means at each end of the axle, the tire supporting means being rigidly connected, said rigid connection comprising a sleeve having at each end an integral connection with the tire supporting means.

11. A wheel assembly comprising the combination with the axle, of a tire and a tire supporting means at each end of the axle, the tire supporting means being rigidly connected.

12. A wheel assembly, comprising the combination with the axle of a rim at each end of the axle, each rim having an integral radial web at its inner end, and a rigid connection between the webs, a roller bearing assembly between each rim and the axle, each roller of each assembly having an annular groove intermediate its ends, and the grooves of each assembly registering, the axle having an annular rib engaging the grooves, and means capable of being inserted between the assembly and the rim and having means for engaging the grooves to hold the assembly in place.

13. A wheel assembly, comprising the combination with the axle, of a rim at each end of the axle, each rim having an integral radial web at its inner end, and a rigid connection between the webs, a roller bearing assembly between each rim and the axle, each roller of each assembly having an annular groove intermediate its ends, and the grooves of each assembly registering, and means capable of being inserted between the assembly and the rim and having means for engaging the grooves to hold the assembly in place.

14. A wheel assembly, comprising the combination with the axle, of a rim at each end of the axle, each rim having an integral radial web at its inner end, and a rigid connection between the webs, a roller bearing assembly between each rim and the axle.

15. In a truck assembly, axles having bearing surfaces at their ends for engaging the journal boxes of the truck assembly, wheel rims at the ends of the axle and rigidly connected, and an anti-friction bearing between each wheel rim and the axle.

16. In car wheels, the combination with the axle and the wheel, of a roller bearing between the wheel and the axle, said bearing comprising a series of annularly grooved rollers, the grooves registering, and means engaging the grooves for preventing displacement of the rollers and for receiving end thrust, said means being supported by the wheel and the axle.

GEORGE YATES.